(12) United States Patent
Tanaka et al.

(10) Patent No.: US 7,053,758 B2
(45) Date of Patent: May 30, 2006

(54) ANTITHEFT DEVICE

(75) Inventors: Shinichi Tanaka, Kobe (JP); Nobuhito Yamazaki, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 132 days.

(21) Appl. No.: 10/478,130

(22) PCT Filed: May 17, 2002

(86) PCT No.: PCT/JP02/04823

§ 371 (c)(1),
(2), (4) Date: Nov. 20, 2003

(87) PCT Pub. No.: WO02/094621

PCT Pub. Date: Nov. 28, 2002

(65) Prior Publication Data

US 2004/0145448 A1 Jul. 29, 2004

(30) Foreign Application Priority Data

May 22, 2001 (JP) .............................. 2001-152035

(51) Int. Cl.
*B60R 25/10* (2006.01)
(52) U.S. Cl. ............................ 340/426.27; 340/426.11; 307/9.1
(58) Field of Classification Search ............. 340/425.5, 340/426.27, 426.28, 426.11, 426.12; 307/9.1, 307/10.1, 10.2, 10.3, 10.6
See application file for complete search history.

(56) References Cited

U.S. PATENT DOCUMENTS

| | | | | |
|---|---|---|---|---|
| 5,382,948 A | * | 1/1995 | Richmond | 340/825.36 |
| 5,673,017 A | * | 9/1997 | Dery et al. | 340/426.17 |
| 5,745,030 A | * | 4/1998 | Aaron | 340/426.11 |
| 6,037,675 A | * | 3/2000 | Yoshida et al. | 307/10.2 |
| 6,101,428 A | * | 8/2000 | Snyder | 701/2 |
| 6,452,772 B1 | * | 9/2002 | Snyder | 361/93.9 |
| 6,885,285 B1 | * | 4/2005 | Losey | 340/5.72 |
| 2001/0020893 A1 | * | 9/2001 | Kawai et al. | 340/425.5 |

FOREIGN PATENT DOCUMENTS

| | | |
|---|---|---|
| JP | 57-178078 | 11/1982 |
| JP | 61-135843 | 6/1986 |
| JP | 3-117069 | 12/1991 |
| JP | 10-53109 | 2/1998 |
| JP | 2000-159061 | 6/2000 |
| JP | 2001-115704 | 4/2001 |

\* cited by examiner

*Primary Examiner*—Jeffery Hofsass
*Assistant Examiner*—George A. Bugg
(74) *Attorney, Agent, or Firm*—Wenderoth, Lind & Ponack,L.L.P.

(57) ABSTRACT

The present invention was achieved in order to provide an antitheft device, which can prevent unauthorized intrusion into a car even if an engine is started by remote control, to be mounted on a vehicle having a remote engine starting system which starts the engine based on a command from a remote control transmitter, comprising a controller to control the state of door windows so as to prohibit at least the opening out of the opening and closing of the door windows when the engine is started by the remote engine starting system.

3 Claims, 7 Drawing Sheets

ANTITHEFT DEVICE

TECHNICAL FIELD

The present invention relates to an antitheft device and, more particularly, to an antitheft device for preventing thefts of a vehicle, electrical equipment mounted on the vehicle, money and articles left inside the vehicle and the like.

BACKGROUND ART

In recent years, there has been a system wherein locking/unlocking of door locks can be conducted by remote control without inserting a key into a door key cylinder (what is called a keyless entry system).

And lately, a system wherein an engine can be started by remote control has been also commercially practical. In such engine starter which can remotely control the starting of the engine, multiple relay switches for forming an ignition circuit and an engine starter circuit, and the like in a separate system from an ignition switch are arranged so that these relay switches are turned on by remote control to start the engine.

By the way, a power window controller mounted on a car is generally constructed so that the connection to the power source is established only when the ignition switch is in the on state. As a result, when the ignition switch is in the off state, a door window is not caused to move up and down, even if a power window switch is pushed.

Therefore, in cases where the driver goes away from the car with a door window or a roof panel slightly open, the door window is not caused to move up and down with the ignition switch in the off state, even if a stick or something is inserted through an opening left by the door window or the roof panel ajar and the power window switch is pushed using the inserted stick.

However, when the engine is started by the above-described engine starter which can remotely control the starting of the engine, power is provided to the ignition circuit through the relay switch. As a result, even if the ignition switch is in the off state, it becomes possible to move the door window up and down.

Therefore, in cases where the engine is started by remote control while the door window or the roof panel is slightly open, there is a possibility that someone may insert a stick or something through an opening left by the door window or the roof panel ajar and push the power window switch using the inserted stick to widely open the door window.

When the door window is widely opened, the unlocking using a door lock knob inside the car can be easily carried out even from the outside of the car, resulting in easy intrusion into the car.

And a sunroof controller mounted on a car is also generally constructed so that power is provided only when the ignition switch is in the on state, in a similar manner to the power window controller. When the engine is started using the above-described engine starter which can remotely control the starting of the engine, power is provided to the ignition circuit through the relay switch, so that it becomes possible to open and close the roof panel even with the ignition switch in the off state.

Therefore, in cases where the engine is started by remote control while the door window or the roof panel is slightly open, someone may insert a stick or something through an opening left by the door window or the roof panel ajar and push a switch of the roof panel using the inserted stick to widely open the roof panel. As a result, the person can easily intrude into the car.

DISCLOSURE OF INVENTION

The present invention was developed in order to solve the above problem, and it is an object of the present invention to provide an antitheft device whereby unauthorized intrusion into a vehicle can be prevented even with an engine started by remote control, so that thefts of the vehicle, electrical equipment mounted on the vehicle, money and articles left inside the vehicle and the like can be prevented.

In order to achieve the above object, an antitheft device (1) according to the present invention is characterized by being an antitheft device to be mounted on a vehicle having a remote engine starting system which starts an engine based on a command from a remote control transmitter, comprising a first controller to control the state of door windows so as to prohibit at least the opening out of the opening and closing of the door windows, when the engine is started by the remote engine starting system.

An antitheft device (2) according to the present invention is characterized by the first controller, being connected to a power window controller mounted on the vehicle, which controls the power window controller so as to prohibit at least the opening out of the opening and closing of the door windows, when the engine is started by the remote engine starting system in the above antitheft device (1).

Using the above antitheft device (1) or (2), at least the opening out of the opening and closing of the door windows is prohibited, when the engine is started by the remote engine starting system. As a result, it is possible to prevent a door window from being widely opened, even if someone inserts a stick or something through an opening left by the door window or a roof panel ajar and pushes a power window switch using the inserted stick, in cases where the engine is started by the remote engine starting system.

Without opening the door window widely, the unlocking using a door lock knob inside the car cannot be easily conducted from the outside of the car, leading to prevention of intrusion into the car. Therefore, even if the engine is started by remote control with the door window or the roof panel slightly open, it is possible to prevent unauthorized intrusion into the car.

An antitheft device (3) according to the present invention is characterized by being an antitheft device to be mounted on a vehicle having a remote engine starting system which starts an engine based on a command from a remote control transmitter, comprising a second controller to control the state of door windows so as to close the door windows, when the engine is started by the remote engine starting system.

An antitheft device (4) according to the present invention is characterized by the second controller, being connected to a power window controller mounted on the vehicle, which controls the power window controller so as to close the door windows, when the engine is started by the remote engine starting system in the above antitheft device (3).

As described in "Background Art", there is a possibility that someone may insert a stick or something through an opening left by a door window ajar and push a power window switch, a roof panel switch or the like using the inserted stick, resulting in wide opening of the door window, the roof panel or the like, in cases where the engine is started by the remote engine starting system with the door window however slightly open.

However, using the above antitheft device (3) or (4), the door window is closed when the engine is started by the remote engine starting system. Therefore, even if the engine is started by the remote engine starting system with the door window open, it is possible to resolve the problem.

As a result, it is possible to prevent unauthorized intrusion into the car, even if the engine is started by remote control with the door window open.

An antitheft device (5) according to the present invention is characterized by being an antitheft device to be mounted on a vehicle having a remote engine starting system which starts an engine based on a command from a remote control transmitter, comprising a third controller to control the state of door locks so as to prohibit the unlocking of doors with manual-switch control, when the engine is started by the remote engine starting system.

An antitheft device (6) according to the present invention is characterized by the third controller, being connected to a door lock controller mounted on the vehicle, which controls the door lock controller so as to prohibit the unlocking of the doors with manual-switch control, when the engine is started by the remote engine starting system in the above antitheft device (5).

Even if a door window is only slightly open, as a matter of course in cases where the door window is wide open, there is a possibility that someone may open the door window widely and easily carry out the unlocking using a door lock knob inside the car, resulting in easy intrusion into the car, when the engine is started by the remote engine starting system.

However, using the above antitheft device (5) or (6), the unlocking of the doors with manual-switch control (for example, operation of a door lock knob or a door lock control switch arranged on the driver's seat side) is prohibited when the engine is started by the remote engine starting system. Therefore, even if the engine is started by the remote engine starting system with the door window open, it is possible to resolve the problem because of the prohibition of the unlocking of the doors with manual-switch control.

As a result, it is possible to prevent unauthorized intrusion into the car, even if the engine is started by remote control with the door window open.

And since the unlocking prohibited is unlocking using a manual switch such as a door lock knob, an authorized driver can unlock the doors by inserting a key into a door key cylinder or by remote control.

An antitheft device (7) according to the present invention is characterized by being an antitheft device to be mounted on a vehicle having a remote engine starting system which starts an engine based on a command from a remote control transmitter, comprising a fourth controller to control the state of a roof panel so as to prohibit at least the opening out of the opening and closing of the roof panel, when the engine is started by the remote engine starting system.

An antitheft device (8) according to the present invention is characterized by the fourth controller, being connected to a sunroof controller mounted on the vehicle, which controls the sunroof controller so as to prohibit at least the opening out of the opening and closing of the roof panel, when the engine is started by the remote engine starting system in the above antitheft device (7).

Using the above antitheft device (7) or (8), at least the opening out of the opening and closing of the roof panel is prohibited, when the engine is started by the remote engine starting system. As a result, it is possible to prevent the roof panel from being widely opened, even if someone inserts a stick or something through an opening left by a door window or the roof panel ajar and pushes a switch of the roof panel using the inserted stick, in cases where the engine is started by the remote engine starting system.

Without opening the roof panel widely, it is hardly possible to intrude into the car through the opening, leading to prevention of intrusion into the car. Therefore, even if the engine is started by remote control with the door window or the roof panel slightly open, it is possible to prevent unauthorized intrusion into the car.

An antitheft device (9) according to the present invention is characterized by being an antitheft device to be mounted on a vehicle having a remote engine starting system which starts an engine based on a command from a remote control transmitter, comprising a fifth controller to control the state of a roof panel so as to close the roof panel, when the engine is started by the remote engine starting system.

An antitheft device (10) according to the present invention is characterized by the fifth controller, being connected to a sunroof controller mounted on the vehicle, which controls the sunroof controller so as to close the roof panel, when the engine is started by the remote engine starting system in the above antitheft device (9).

As described in "Background Art", there is a possibility that someone may insert a stick or something through an opening left by the roof panel ajar and push a power window switch, a roof panel switch or the like using the inserted stick, resulting in wide opening of the door window, the roof panel or the like, in cases where the engine is started by the remote engine starting system with the roof panel however slightly open.

However, using the above antitheft device (9) or (10), the roof panel is closed when the engine is started by the remote engine starting system. Therefore, even if the engine is started by the remote engine starting system with the roof panel open, it is possible to resolve the problem because of the closing of the roof panel.

As a result, it is possible to prevent unauthorized intrusion into the car, even if the engine is started by remote control with the roof panel open.

BEST MODE FOR CARRYING OUT THE INVENTION

Figure 1:
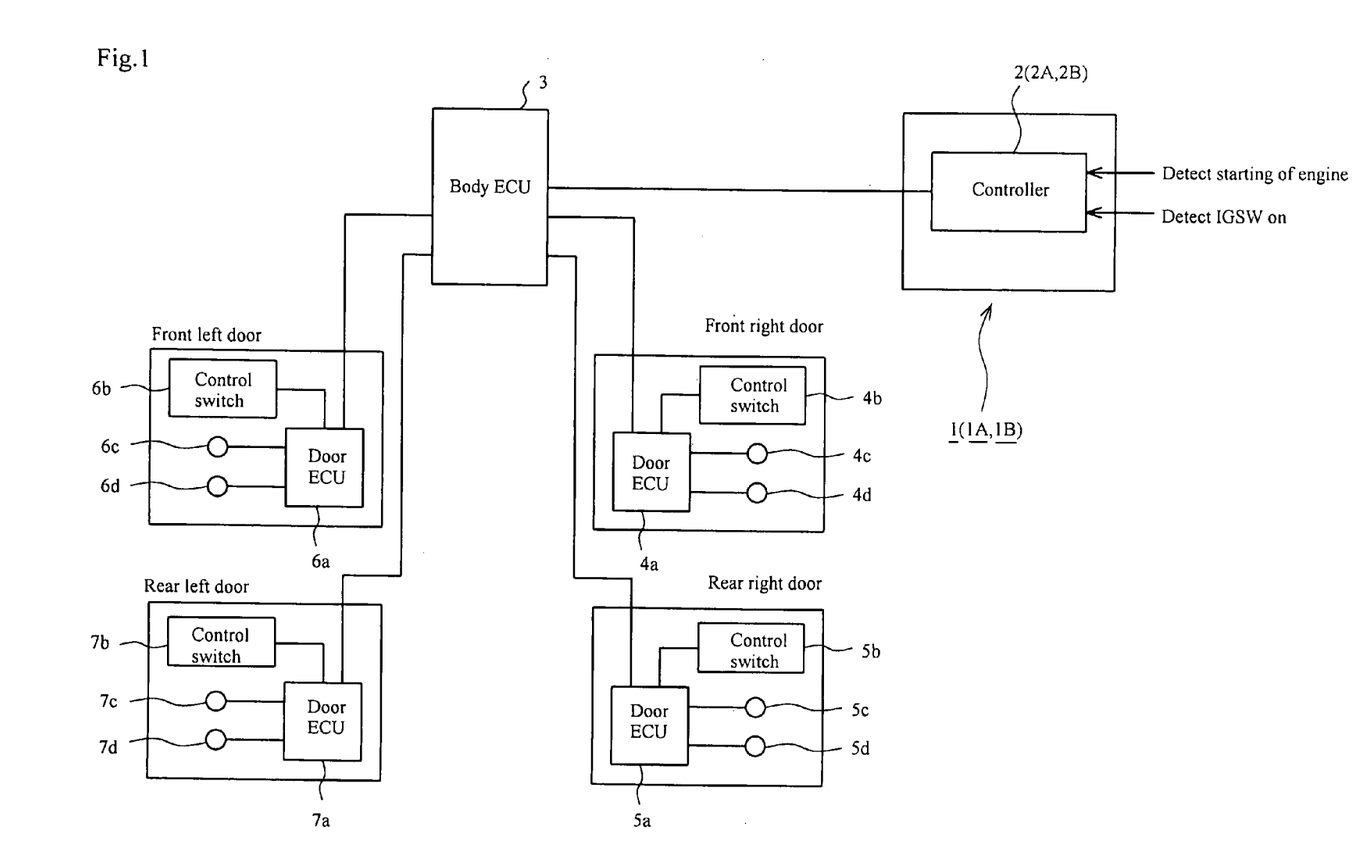
FIG. 1 is a block diagram schematically showing the principal part of an antitheft system in which an antitheft device according to an embodiment (1) of the present invention is adopted.

The preferred embodiments of the antitheft device according to the present invention are described below by reference to the Figures of the drawings. FIG. 1 is a block diagram schematically showing the principal part of an antitheft system wherein an antitheft device according to an embodiment (1) is adopted.

Reference numeral 1 in the figure represents an antitheft control unit, comprising a controller 2 which is connected to a body ECU 3. The controller 2 can capture signals showing whether an engine was started and signals showing whether an ignition switch was turned on, so that it can detect whether the engine was started by remote control or not.

Door ECUs 4a–7a arranged in each door are connected to the body ECU 3 using a signal line, and communications between the ECUs each are conducted by the start-stop synchronization. To the door ECUs 4a–7a, control switches 4b–7b of a control system relating to the body are connected, so that the state of power window switches, the state of door lock knobs and the like can be captured. Furthermore, those items of information are transmitted to the body ECU 3.

The body ECU 3 transmits driving signals of actuators such as power window motors 4c–7c or door lock-unlock solenoids 4d–7d based on signals from the door ECUs 4a–7a. The door ECUs 4a–7a control the driving of the power window motors 4c–7c or the door lock-unlock solenoids 4d–7d based on the signals from the body ECU 3.

For example, when the body ECU 3 receives signals requesting the opening/closing of door windows or signals requesting the locking/unlocking of doors transmitted from the door ECUs 4a–7a arranged in each door, it conducts processing based on these requests and transmits driving signals of the power window motors 4c–7c or the door lock-unlock solenoids 4d–7d to the door ECUs 4a–7a arranged in each door.

When the body ECU 3 receives a signal requesting the prohibition of the opening and closing of the door windows or a signal requesting the prohibition of the unlocking of the doors transmitted from the door ECU 4a arranged in the driver's seat side door, even if it receives any signal requesting the opening/closing of a door window or any signal requesting the unlocking of a door transmitted from each of the door ECUs 4a–7a, it ignores the request until a reset signal is received.

Figure 2:
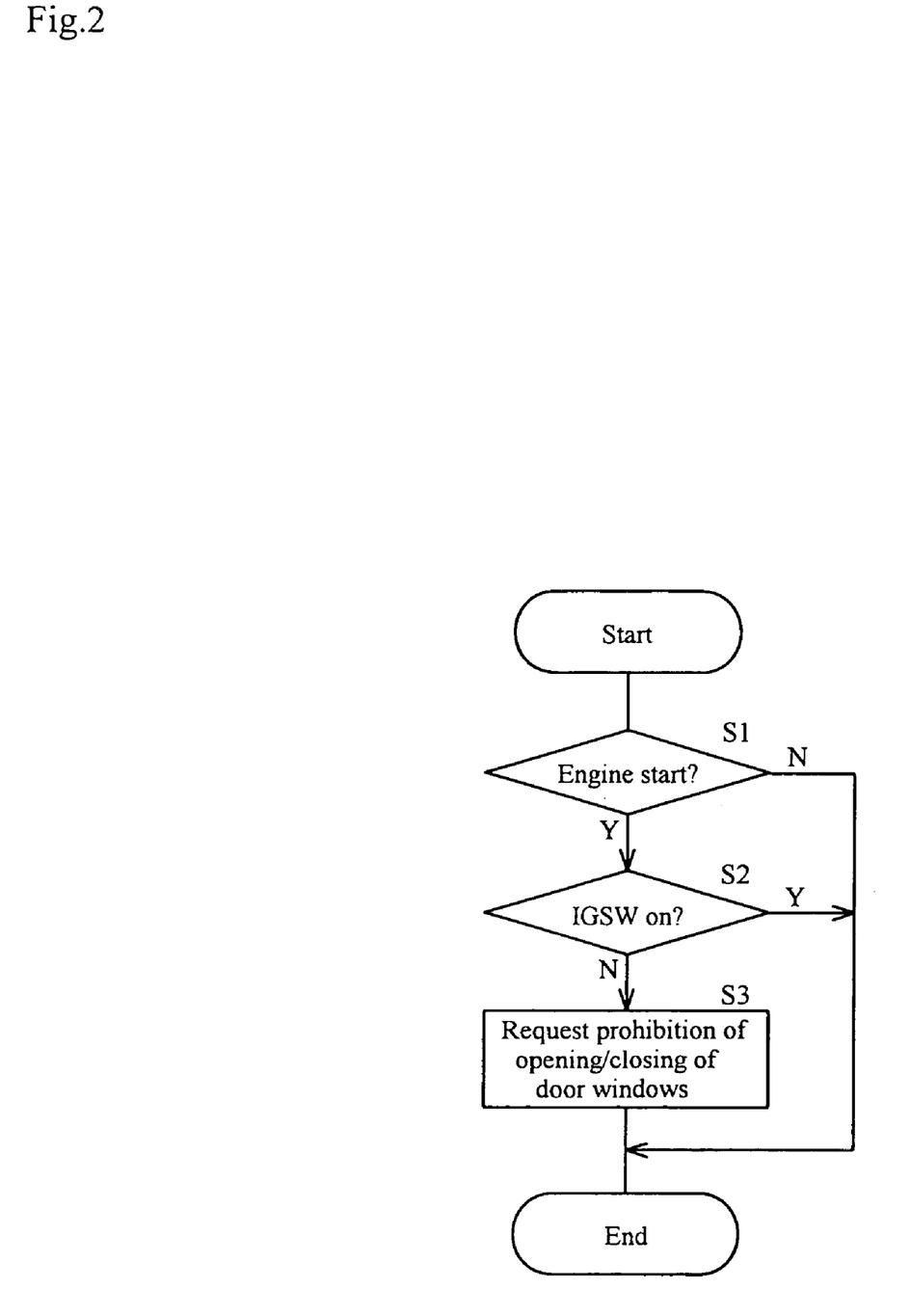
FIG. 2 is a flow chart showing the processing operation performed by a controller of an antitheft control unit in the antitheft system in which the antitheft device according to the embodiment (1) is adopted.

The processing operation ① performed by the controller 2 of the antitheft control unit 1 in the antitheft system wherein the antitheft device according to the embodiment (1) is adopted is described below by reference to a flow chart shown in FIG. 2. First, whether the engine has been started or not is judged (Step 1). When the engine is judged not to have been started, the processing operation ① is ended at once. On the other hand, when the engine is judged to have been started, whether the ignition switch has been turned on or not is judged (Step 2).

When it is judged that the ignition switch has not been turned on (that is, the engine has been started, but the ignition switch is not in the on state), it is concluded that the engine was started by remote control and a signal requesting the prohibition of the opening and closing of the door windows is transmitted to the body ECU 3 (Step 3). On the other hand, when it is judged that the ignition switch has been turned on (that is, the normal starting of the engine using a key was conducted), the processing operation ① is ended at once since it is not necessary to request the prohibition of the opening and closing of the door windows.

Here, whether the engine has been started by remote control or not is theoretically judged based on the information such as whether the ignition switch is in the on state or not while the engine has been started, but in another embodiment, it may be directly judged based on the information such as whether a switch of a remote engine starting system was turned on or not.

Using the above antitheft device according to the embodiment (1), the opening and closing of the door windows are prohibited when the engine is started by remote control. Therefore, even if someone inserts a stick or something through an opening left by a door window or a roof panel ajar and pushes a power window switch using the inserted stick in a case where the engine is started by remote control, it is possible to prevent the door window from being opened widely.

Without opening the door window widely, the unlocking using a door lock knob inside the car cannot be easily conducted from the outside of the car, leading to prevention of intrusion into the car. As a result, even if the engine is started by remote control with the door window or the roof panel slightly open, it is possible to prevent unauthorized intrusion into the car.

Here, in the above antitheft device according to the embodiment (1), request signals are transmitted to the body ECU 3, but in an antitheft device according to another embodiment, signals may be transmitted not to a body ECU 3 but directly to door ECUs 4a–7a arranged in each door. In an antitheft device according to still another embodiment, the control so as to provide no power to power window motors 4c–7c may be conducted.

Moreover, in the above antitheft device according to the embodiment (1), the opening and closing of the door windows are prohibited, but in an antitheft device according to another embodiment, only the opening of door windows may be prohibited.

An antitheft system wherein an antitheft device according to an embodiment (2) is adopted is described below. Here, since the construction of the antitheft system wherein the antitheft device according to the embodiment (2) is adopted is similar to that of the antitheft system shown in FIG. 1 except the controller 2 and the antitheft control unit 1 comprising the controller 2, a controller and an antitheft control unit are differently marked, and others are not described below.

Figure 3:
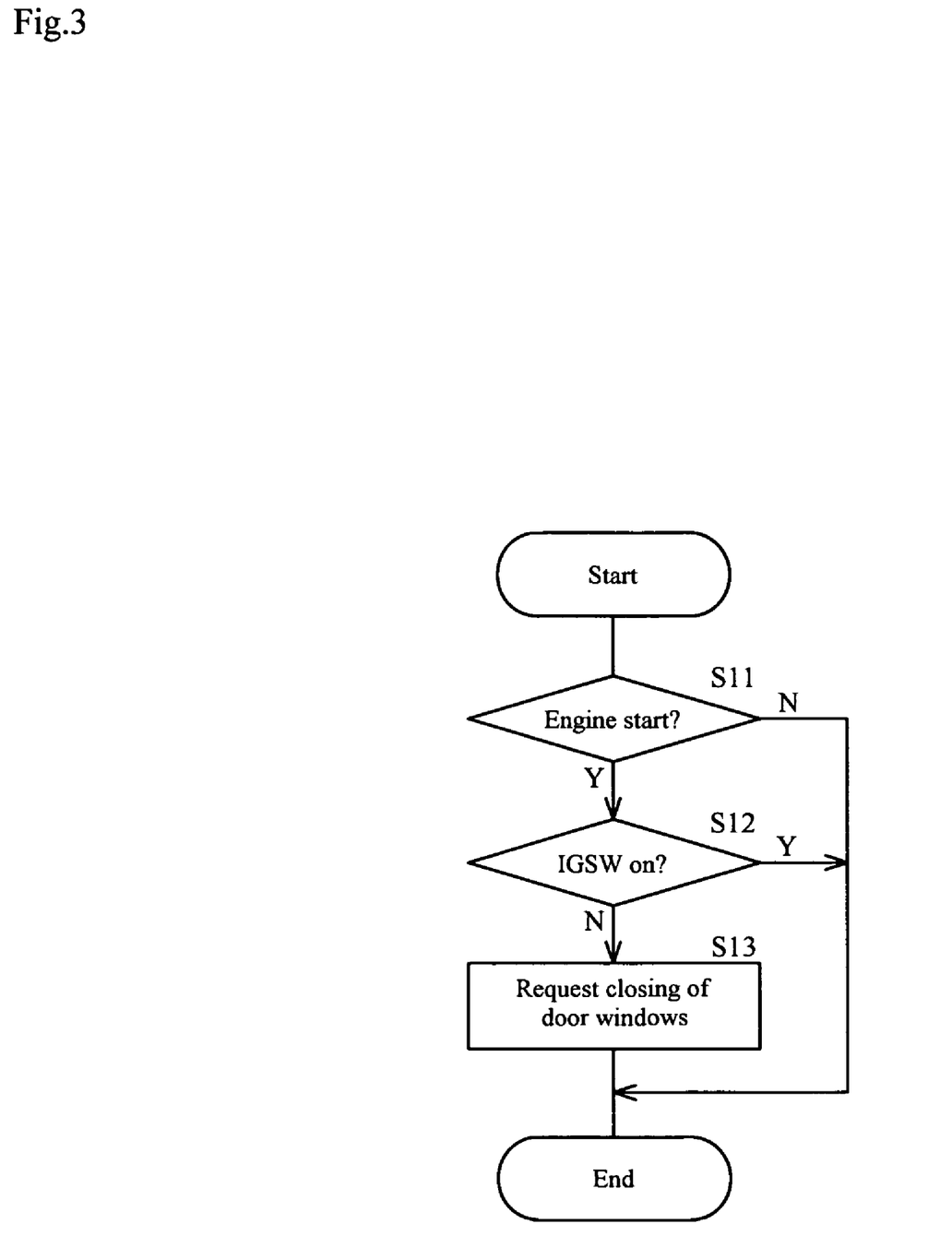
FIG. 3 is a flow chart showing the processing operation performed by a controller of an antitheft control unit in an antitheft system in which an antitheft device according to an embodiment (2) is adopted.

The processing operation ② performed by the controller 2A of the antitheft control unit 1A in the antitheft system wherein the antitheft device according to the embodiment (2) is adopted is described below by reference to a flow chart shown in FIG. 3. First, whether the engine has been started or not is judged (Step 11). When the engine is judged not to have been started, the processing operation ② is ended at once. On the other hand, when the engine is judged to have been started, whether the ignition switch has been turned on or not is judged (Step 12).

When it is judged that the ignition switch has not been turned on (that is, the engine has been started, but the ignition switch is not in the on state), it is concluded that the engine was started by remote control and a signal requesting the closing of door windows is transmitted to a body ECU 3 (Step 13). On the other hand, when it is judged that the ignition switch has been turned on (that is, the normal starting of the engine using a key was conducted), the processing operation ② is ended at once since it is not necessary to request the closing of the door windows.

Using the above antitheft device according to the embodiment (2), the door windows are closed when the engine is started by remote control. Therefore, even if the engine is started by remote control with a door window open, the door window can be closed.

As a result, even if the engine is started by remote control with the door window open, it is possible to prevent unauthorized intrusion into the car.

Here, in the above antitheft device according to the embodiment (2), request signals are transmitted to the body ECU 3, but in an antitheft device according to another embodiment, signals may be transmitted not to the body ECU 3 but directly to door ECUs 4a–7a arranged in each door. In an antitheft device according to still another embodiment, the driving of power window motors 4c–7c may be directly controlled.

An antitheft system wherein an antitheft device according to an embodiment (3) is adopted is described below. Here, since the construction of the antitheft system wherein the antitheft device according to the embodiment (3) is adopted is similar to that of the antitheft system shown in FIG. 1 except the controller 2 and the antitheft control unit 1 comprising the controller 2, a controller and an antitheft control unit are differently marked, and others are not described below.

Figure 4:
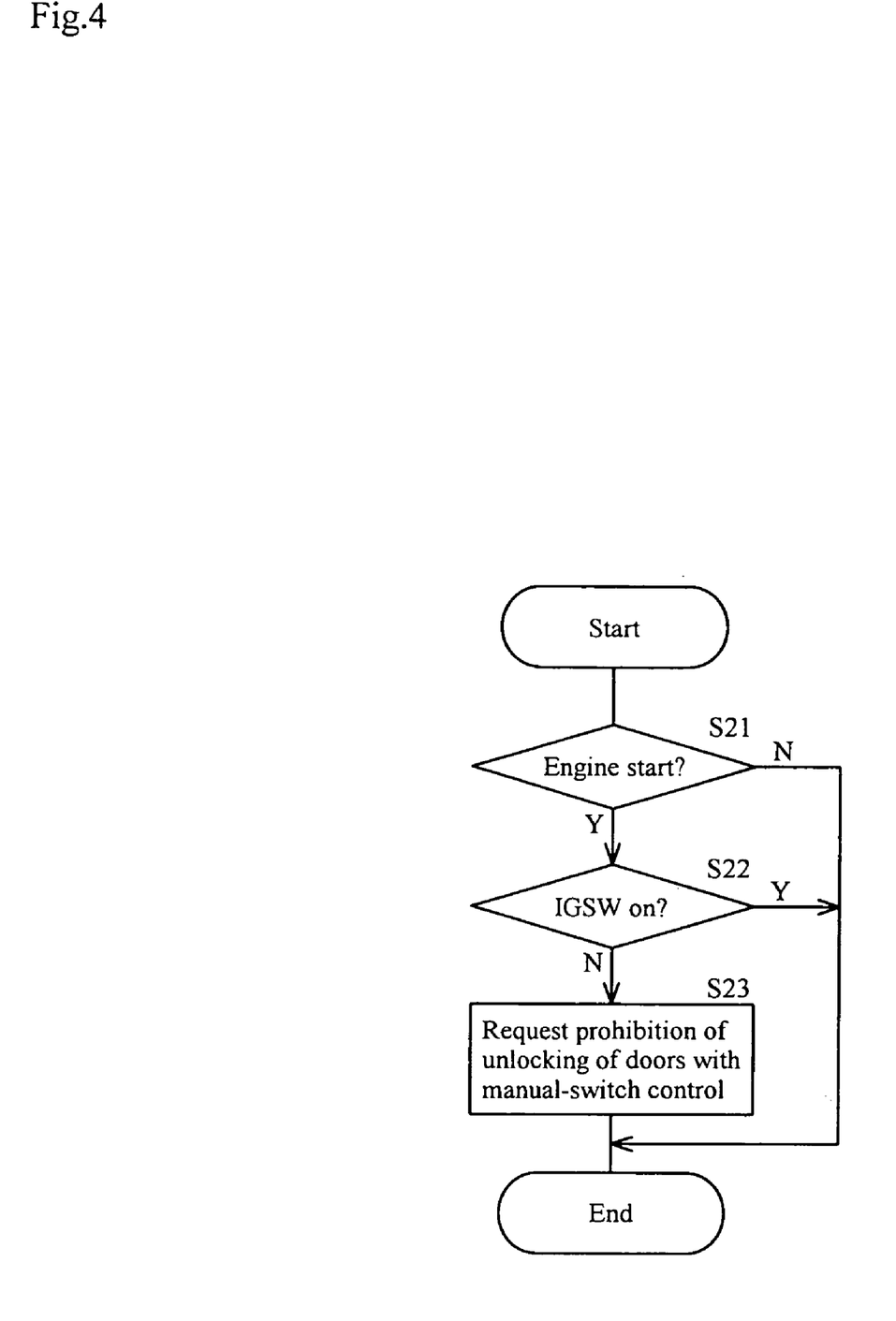
FIG. 4 is a flow chart showing the processing operation performed by a controller of an antitheft control unit in an antitheft system in which an antitheft device according to an embodiment (3) is adopted.

The processing operation ③ performed by the controller 2B of the antitheft control unit 1B in the antitheft system wherein the antitheft device according to the embodiment (3) is adopted is described below by reference to a flow chart shown in FIG. 4. First, whether the engine has been started or not is judged (Step 21). When the engine is judged not to have been started, the processing operation ③ is ended at once. On the other hand, when the engine is judged to have been started, whether the ignition switch has been turned on or not is judged (Step 22).

When it is judged that the ignition switch has not been turned on (that is, the engine has been started, but the ignition switch is not in the on state), it is concluded that the engine was started by remote control and a signal requesting the prohibition of the unlocking of doors with manual-switch control (e.g. operation of a door lock knob or a door lock control switch arranged on the driver's seat side) is transmitted to a body ECU 3 (Step 23). On the other hand, when it is judged that the ignition switch has been turned on (that is, the normal starting of the engine using a key was conducted), the processing operation ③ is ended at once since it is not necessary to request the prohibition of the unlocking of the doors.

Using the above antitheft device according to the embodiment (3), the unlocking of the doors with manual-switch control is prohibited when the engine is started by remote control. Therefore, even if the engine is started by remote control with a door window open, it is possible to prohibit the unlocking of the doors with manual-switch control.

As a result, even if the engine is started by remote control with the door window open, it is possible to prevent unauthorized intrusion into the car.

And the unlocking prohibited is unlocking using a manual switch such as a door lock knob, so that an authorized driver can unlock the doors by inserting a key into a door key cylinder or by remote control.

Here, in the above antitheft device according to the embodiment (3), request signals are transmitted to the body ECU 3, but in an antitheft device according to another embodiment, signals may be transmitted not to the body ECU 3 but directly to door ECUs 4a–7a arranged in each door. In an antitheft device according to still another embodiment, the driving of door lock-unlock solenoids 4d–7d may be directly controlled.

Figure 5:
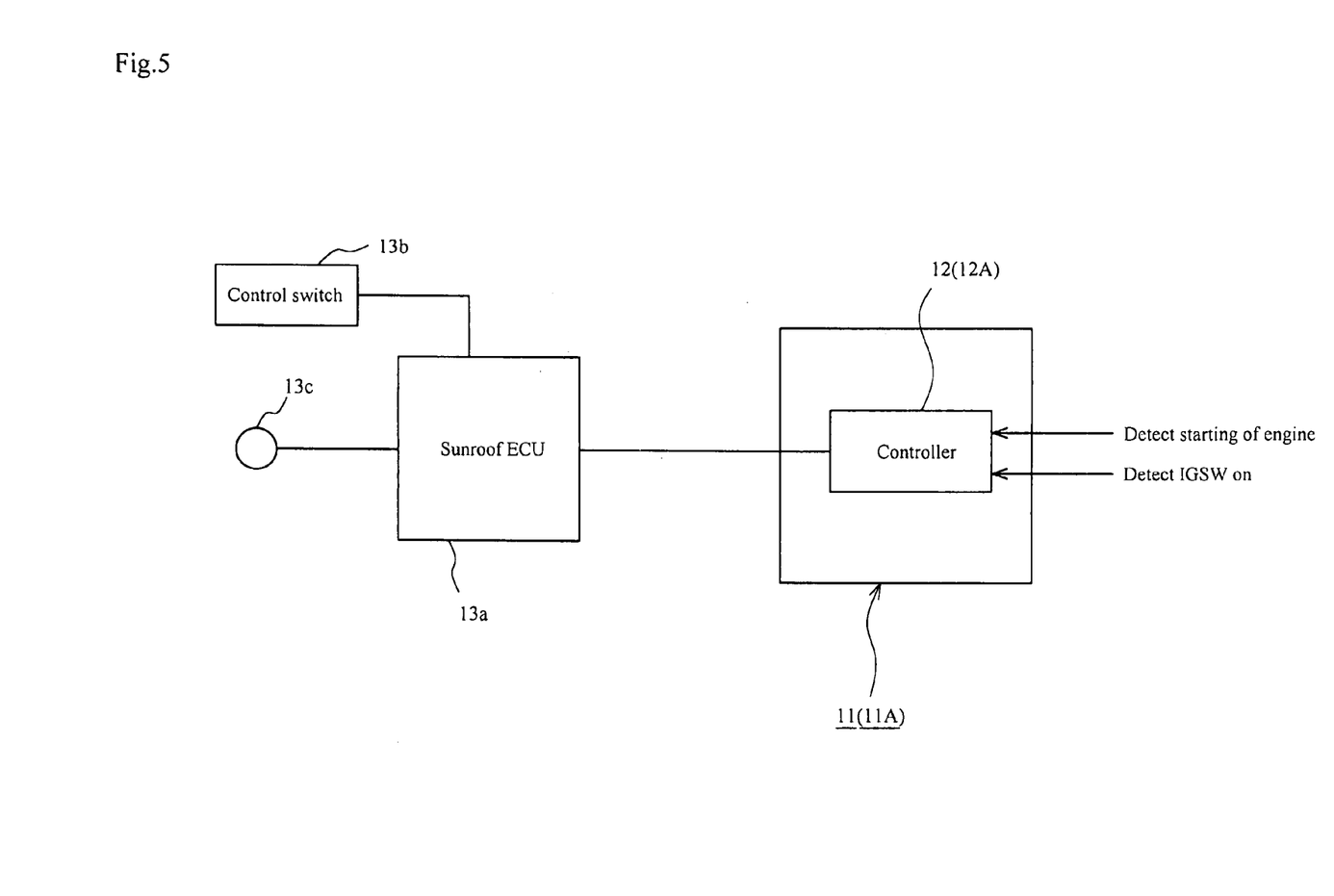
FIG. 5 is a block diagram schematically showing the principal part of an antitheft system in which an antitheft device according to an embodiment (4) is adopted.

FIG. 5 is a block diagram schematically showing the principal part of an antitheft system wherein an antitheft device according to an embodiment (4) is adopted.

Reference numeral 11 in the figure represents an antitheft control unit, comprising a controller 12 which is connected to a sunroof ECU 13a. The controller 12 can capture signals showing whether an engine was started and signals showing whether an ignition switch was turned on, so that it can detect whether the engine was started by remote control or not.

To the sunroof ECU 13a, a control switch 13b for controlling the opening and closing, and the like of a roof panel is connected, so that the driving of a roof panel motor 13c is controlled based on signals from the control switch 13b.

Figure 6:
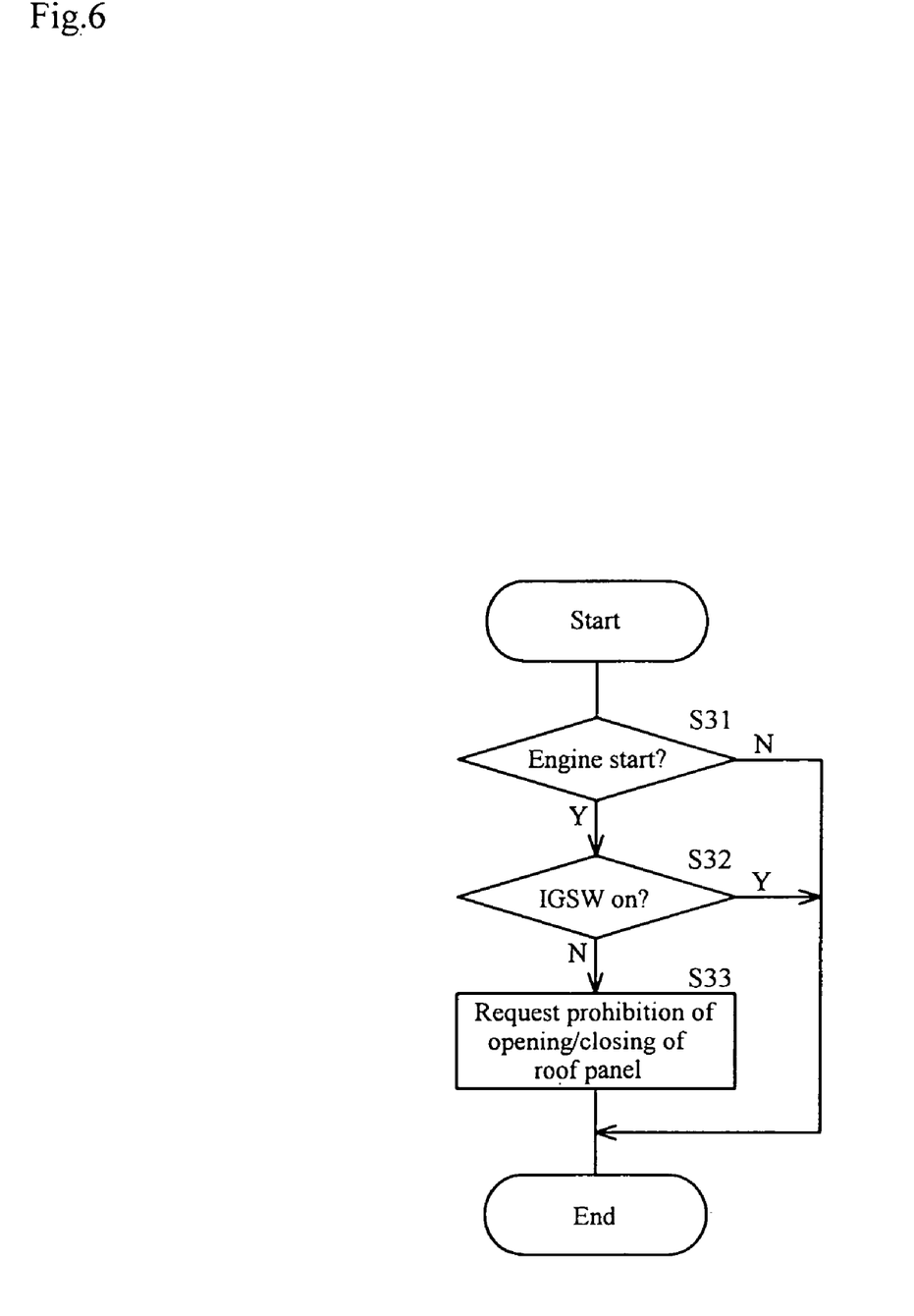
FIG. 6 is a flow chart showing the processing operation performed by a controller of an antitheft control unit in the antitheft system in which the antitheft device according to the embodiment (4) is adopted.

The processing operation ④ performed by the controller 12 of the antitheft control unit 11 in the antitheft system wherein the antitheft device according to the embodiment (4) is adopted is described below by reference to a flow chart shown in FIG. 6. First, whether the engine has been started or not is judged (Step 31). When the engine is judged not to have been started, the processing operation ④ is ended at once. On the other hand, when the engine is judged to have been started, whether the ignition switch has been turned on or not is judged (Step 32).

When it is judged that the ignition switch has not been turned on (that is, the engine has been started, but the ignition switch is not in the on state), it is concluded that the engine was started by remote control and a signal requesting the prohibition of the opening and closing of the roof panel is transmitted to the sunroof ECU 13a (Step 33). On the other hand, when it is judged that the ignition switch has been turned on (that is, the normal starting of the engine using a key was conducted), the processing operation ④ is ended at once since it is not necessary to request the prohibition of the opening and closing of the roof panel.

Using the above antitheft device according to the embodiment (4), the opening and closing of the roof panel are prohibited when the engine is started by remote control. Therefore, even if someone inserts a stick or something through an opening left by a door window or the roof panel ajar and pushes a switch of the roof panel using the inserted stick in a case where the engine is started by remote control, it is possible to prevent the roof panel from being opened widely.

Without opening the roof panel widely, it is hardly possible to intrude into the car from the opening, leading to prevention of intrusion into the car. As a result, even if the engine is started by remote control with the door window or the roof panel slightly open, it is possible to prevent unauthorized intrusion into the car.

Here, in the above antitheft device according to the embodiment (4), signals requesting the prohibition of the opening and closing of the roof panel are transmitted to the sunroof ECU 13a, but in an antitheft device according to another embodiment, the control so as to provide no power to the roof panel motor 13c may be conducted.

Moreover, in the above antitheft device according to the embodiment (4), the opening and closing of the roof panel are prohibited, but in an antitheft device according to another embodiment, only the opening of a roof panel may be prohibited.

An antitheft system wherein an antitheft device according to an embodiment (5) is adopted is described below. Here, since the construction of the antitheft system wherein the antitheft device according to the embodiment (5) is adopted is similar to that of the antitheft system shown in FIG. 5 except the controller 12 and the antitheft control unit 11 comprising the controller 12, a controller and an antitheft control unit are differently marked, and others are not described below.

Figure 7:
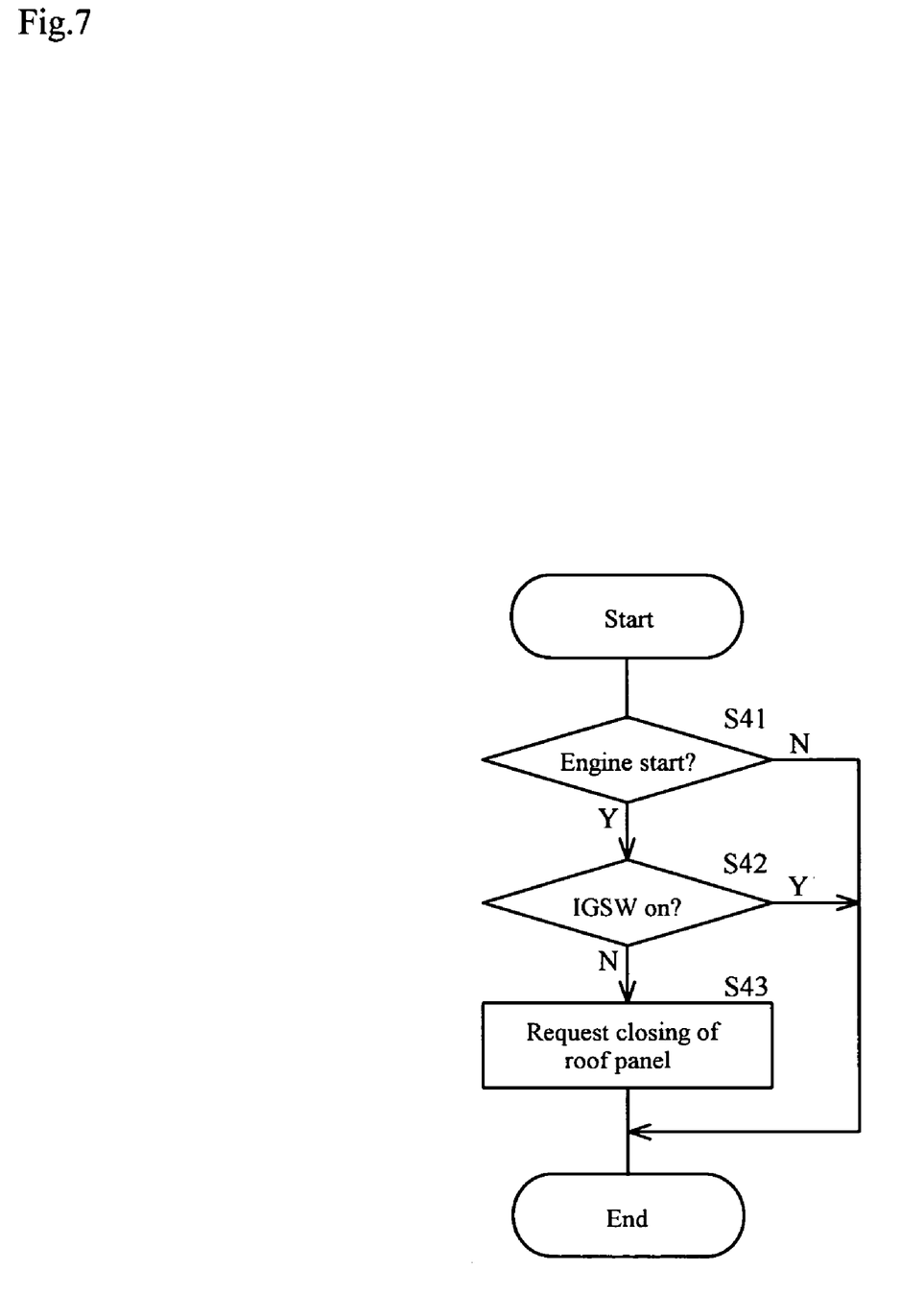
FIG. 7 is a flow chart showing the processing operation performed by a controller of an antitheft control unit in an antitheft system in which an antitheft device according to an embodiment (5) is adopted.

The processing operation ⑤ performed by the controller 12A of the antitheft control unit 11A in the antitheft system wherein the antitheft device according to the embodiment (5) is adopted is described below by reference to a flow chart shown in FIG. 7. First, whether the engine has been started or not is judged (Step 41). When the engine is judged not to have been started, the processing operation ⑤ is ended at once. On the other hand, when the engine is judged to have been started, whether the ignition switch has been turned on or not is judged (Step 42).

When it is judged that the ignition switch has not been turned on (that is, the engine has been started, but the ignition switch is not in the on state), it is concluded that the engine was started by remote control and a signal requesting the closing of a roof panel is transmitted to a sunroof ECU 13a (Step 43). On the other hand, when it is judged that the ignition switch has been turned on (that is, the normal starting of the engine using a key was conducted), the processing operation ⑤ is ended at once since it is not necessary to request the closing of the roof panel.

Using the above antitheft device according to the embodiment (5), the roof panel is closed when the engine is started by remote control. Therefore, even if the engine is started by remote control with the roof panel open, the roof panel can be closed.

As a result, even if the engine is started by remote control with the roof panel open, it is possible to prevent unauthorized intrusion into the car.

Here, in the above antitheft device according to the embodiment (5), request signals are transmitted to the sunroof ECU 13a, but in an antitheft device according to another embodiment, the driving of a roof panel motor 13c may be directly controlled.

In the above antitheft devices according to the embodiments (1)–(5), when the engine is started by remote control, the opening and closing of the door windows are prohibited, the door windows are forcefully closed, the manual unlocking is prohibited, the opening and closing of the roof panel are prohibited, or the roof panel is forcefully closed. But in an antitheft device according to another embodiment, multiple functions among these may be combined. For example, the opening and closing of both door windows and a roof panel may be prohibited, or both door windows and a roof panel may be forcefully closed. Or after closing door windows and the like, the opening and closing thereof may be prohibited.

INDUSTRIAL APPLICABILITY

The present invention relates to an antitheft device and, more particularly, to an antitheft device for preventing thefts of a vehicle, electrical equipment mounted on the vehicle, money and articles left inside the vehicle and the like, which has a high possibility of being widely utilized in the automobile industry.

The invention claimed is:

1. An antitheft device, to be mounted on a vehicle having a remote engine starting system which starts an engine based on a command from a remote control transmitter, said antitheft device comprising:
   a controller operable to control a state of door windows so as to prohibit at least an opening of the door windows, out of the opening and closing of the door windows, if it is determined that the engine was started by the remote engine starting system.

2. An antitheft device according to claim 1,
   wherein said first controller is connected to a power window controller mounted on the vehicle; and
   wherein said first controller controls the power window controller so as to prohibit at least the opening out of the opening and closing of the door windows, when the engine is started by the remote engine starting system.

3. An antitheft device according to claim 1, wherein said controller is operable to determine whether the engine was started by the remote engine starting system.

* * * * *